United States Patent
Oh et al.

(10) Patent No.: US 11,054,568 B2
(45) Date of Patent: Jul. 6, 2021

(54) DISPLAY DEVICE HAVING OPTICAL MEMBER, OPTICAL MEMBER CONTROLLED WITH PATTERN SHAPING WIRES, AND METHOD OF FABRICATING OPTICAL MEMBER

(71) Applicant: Samsung Display Co., Ltd., Yongin-si (KR)

(72) Inventors: Sunhee Oh, Anyang-si (KR); Junwoo You, Seongnam-si (KR); Taeho Lee, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/365,926

(22) Filed: Mar. 27, 2019

(65) Prior Publication Data
US 2019/0310410 A1    Oct. 10, 2019

(30) Foreign Application Priority Data
Apr. 5, 2018    (KR) .................. 10-2018-0039928

(51) Int. Cl.
*F21V 8/00* (2006.01)
*G02F 1/061* (2006.01)

(52) U.S. Cl.
CPC ........... *G02B 6/005* (2013.01); *G02B 6/0068* (2013.01); *G02F 1/061* (2013.01)

(58) Field of Classification Search
CPC ........ G02B 6/005; G02B 6/0068; G02F 1/061
See application file for complete search history.

(56) References Cited

U.S. PATENT DOCUMENTS

| 6,930,817 B2 | 8/2005 | Srinivasan et al. |
| 9,081,190 B2 | 7/2015 | Holman et al. |
| 2008/0252823 A1* | 10/2008 | Hwang ............... G02F 1/13362 349/96 |

(Continued)

FOREIGN PATENT DOCUMENTS

| KR | 10-2014-0038867 | 3/2014 |
| KR | 10-1454171 | 10/2014 |

OTHER PUBLICATIONS

Oh Min Kwon, "A Study on the improvement of adhesion characteristic between PVDF fiber and PDMS," Dec. 2013, pp. 1-83, Andong National University, Andong, Korea.

*Primary Examiner* — Rajarshi Chakraborty
*Assistant Examiner* — Michael Chiang
(74) *Attorney, Agent, or Firm* — H.C. Park & Associates, PLC

(57) ABSTRACT

A display device includes a display panel, a light guide plate, a first light source unit, and an optical member. The light guide plate is on the display panel. The first light source unit is configured to provide light to a side surface of the light guide plate. The optical member is between the light guide plate and the display panel. The optical member includes an interconnection layer, an optical pattern unit including first optical patterns on a surface of the interconnection layer, and first pattern shaping wires configured to receive a control voltage from the interconnection layer and to control a shape of each of the first optical patterns via the control voltage. Each of the first optical patterns is connected to a respective some of the first pattern shaping wires.

13 Claims, 11 Drawing Sheets

(56) References Cited

U.S. PATENT DOCUMENTS

| | | | |
|---|---|---|---|
| 2008/0291525 A1* | 11/2008 | Kim | G02F 1/133553 |
| | | | 359/291 |
| 2009/0135469 A1 | 5/2009 | Lee et al. | |
| 2013/0235442 A1* | 9/2013 | Seike | G02B 26/02 |
| | | | 359/222.1 |
| 2017/0192156 A1* | 7/2017 | Song | G02B 6/0038 |
| 2017/0219859 A1* | 8/2017 | Christophy | G02F 1/1336 |
| 2018/0088345 A1* | 3/2018 | Won | G02B 30/27 |
| 2018/0188443 A1* | 7/2018 | Qian | F21S 2/005 |

* cited by examiner

DISPLAY DEVICE HAVING OPTICAL MEMBER, OPTICAL MEMBER CONTROLLED WITH PATTERN SHAPING WIRES, AND METHOD OF FABRICATING OPTICAL MEMBER

CROSS-REFERENCE TO RELATED APPLICATION

This application claims priority from and the benefit of Korean Patent Application No. 10-2018-0039928, filed Apr. 5, 2018, which is hereby incorporated by reference for all purposes as if fully set forth herein.

BACKGROUND

Field

Exemplary embodiments generally relate to an optical member having a uniform light emitting effect, a display device including the optical member, and a method of fabricating the optical member.

Discussion

A liquid crystal display device typically includes a liquid crystal display panel in which a liquid crystal layer is disposed between two opposing substrates. If a voltage is applied to an electrode of the liquid crystal display panel, an electric field is produced in the liquid crystal layer. The electric field can be used to control an alignment direction of liquid crystal molecules of the liquid crystal layer and a polarization of an incident light. This process can be used to display an image via the liquid crystal display device. Since a liquid crystal display panel is not self-luminous, the liquid crystal display device typically includes a light generating unit configured to provide light to the liquid crystal display panel.

In the case where the light generating unit is an edge-type light generating unit, the light generating unit usually includes a light guide plate, a light source unit (which is disposed on a side surface of the light guide plate and is used to provide light to the light guide plate), and an optical member (which is disposed on a light emitting surface of the light guide plate and includes optical patterns). An amount of light incident into the optical patterns may vary depending on a distance between the light source unit and the optical patterns. Thus, to realize a uniform light emitting effect, the optical patterns typically have a non-uniform pattern density. In the case where the optical patterns are arranged in a non-uniform pattern density, the probability of failure in forming the optical patterns is increased, and, in the case where the optical patterns are attached to a base film, an adhesive strength varies depending on an attachment position of the optical patterns. Variation in the adhesive strength may cause a delamination failure to occur between the optical patterns and the base film.

The above information disclosed in this section is only for understanding the background of the inventive concepts, and, therefore, may contain information that does not form prior art.

SUMMARY

Some exemplary embodiments provide an optical member capable of realizing a uniform light emitting effect.

Some exemplary embodiments provide a display device including an optical member capable of realizing a uniform light emitting effect.

Some embodiments provide a method of manufacturing an optical member capable of realizing a uniform light emitting effect.

Additional aspects will be set forth in the detailed description which follows, and, in part, will be apparent from the disclosure, or may be learned by practice of the inventive concepts.

According to some exemplary embodiments, a display device includes a display panel, a light guide plate, a first light source unit, and an optical member. The light guide plate is on the display panel. The first light source unit is configured to provide light to a side surface of the light guide plate. The optical member is between the light guide plate and the display panel. The optical member includes an interconnection layer, an optical pattern unit including first optical patterns on a surface of the interconnection layer, and first pattern shaping wires configured to receive a control voltage from the interconnection layer and to control a shape of each of the first optical patterns via the control voltage. Each of the first optical patterns is connected to a respective some of the first pattern shaping wires.

In some exemplary embodiments, each of the first optical patterns may have an isolated pattern shape when viewed in a plan view and may have a trapezoidal shape when viewed in a sectional view. The first pattern shaping wires may be connected to side surfaces the first optical patterns.

In some exemplary embodiments, each of the first optical patterns may have a bar shape extending in a first direction when viewed in a plan view and may have a trapezoidal shape when viewed in a sectional view taken along a second direction crossing the first direction. The first pattern shaping wires may be connected to side surfaces of the first optical patterns.

In some exemplary embodiments, the first optical patterns may be spaced apart from each other by a uniform distance.

In some exemplary embodiments, each of the first pattern shaping wires may include an electroactive polymer, and application of the control voltage to the first pattern shaping wires may be configured to change a shape of at least some of the first optical patterns.

In some exemplary embodiments, the optical pattern unit may further include second optical patterns, and when viewed in a plan view, a first distance between the first light source unit and each of the first optical patterns may be greater than a second distance between the first light source unit and any of the second optical patterns.

In some exemplary embodiments, the display device may further include second pattern shaping wires configured to control a shape of each of the second optical patterns, each of the second optical patterns being connected to a respective some of the second pattern shaping wires. A number of the second pattern shaping wires connected to each of the second optical patterns may be less than a number of the first pattern shaping wires connected to each of the first optical patterns.

In some exemplary embodiments, the optical pattern unit may further include third optical patterns, and when viewed in a plan view, a third distance between the first light source unit and each of the third optical patterns may be greater than the first distance and the second distance.

In some exemplary embodiments, the display device may further include a second light source unit configured to provide light to the light guide plate. The first light source unit and the second light source unit may face each other with the light guide plate disposed therebetween.

In some exemplary embodiments, the first optical patterns may include two optical patterns, one of which may be spaced apart from the first light source unit by a first distance and may have a first surface area, and the other of which may be spaced apart from the first light source unit by a second distance greater than the first distance and may have a second surface area. The first surface area may be smaller than the second surface area.

In some exemplary embodiments, the first pattern shaping wires connected to the optical pattern having the first surface area may be configured to receive a first control voltage, the first pattern shaping wires connected to the optical pattern having the second surface area may be configured to receive a second control voltage, and the first control voltage may be smaller than the second control voltage.

In some exemplary embodiments, each of the first optical patterns may include a first surface facing the light guide plate, a second surface facing the display panel, and a side surface connecting the first surface to the second surface. An area of the first surface may be less than an area of the second surface. The first pattern shaping wires may be connected to the side surfaces of the first optical patterns.

In some exemplary embodiments, the display panel may be configured to provide an image in a direction toward the light guide plate.

In some exemplary embodiments, the display panel may be configured to provide an image in a direction away from the light guide plate.

According to some exemplary embodiments, an optical member includes a base layer, an interconnection layer, an optical pattern, and pattern shaping wires. The interconnection layer is on the base layer. The optical pattern is on a surface of the interconnection layer. The pattern shaping wires are connected to the optical pattern and the interconnection layer. The optical pattern includes a first surface, a second surface facing the first surface, and a side surface connecting the first surface to the second surface. The pattern shaping wires are connected to the side surface.

In some exemplary embodiments, the first surface may be between the interconnection layer and the second surface, and an area of the first surface may be smaller than an area of the second surface.

In some exemplary embodiments, each of the pattern shaping wires may include an electroactive polymer.

In some exemplary embodiments, a shape of the side surface may be configured to change in response to a control voltage applied to the pattern shaping wires via the interconnection layer.

In some exemplary embodiments, the optical pattern may be one of a plurality of optical patterns, and the control voltage applied to the pattern shaping wires may vary according to a position of the optical patterns.

According to some exemplary embodiments, a method of manufacturing an optical member includes forming an interconnection layer on a base layer, forming an optical pattern on the interconnection layer, and connecting a pattern shaping wire to the optical pattern using a coupling agent.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concepts, and are incorporated in and constitute a part of this specification, illustrate exemplary embodiments of the inventive concepts, and, together with the description, serve to explain principles of the inventive concepts.

DETAILED DESCRIPTION OF THE ILLUSTRATED EMBODIMENTS

Figure 1:
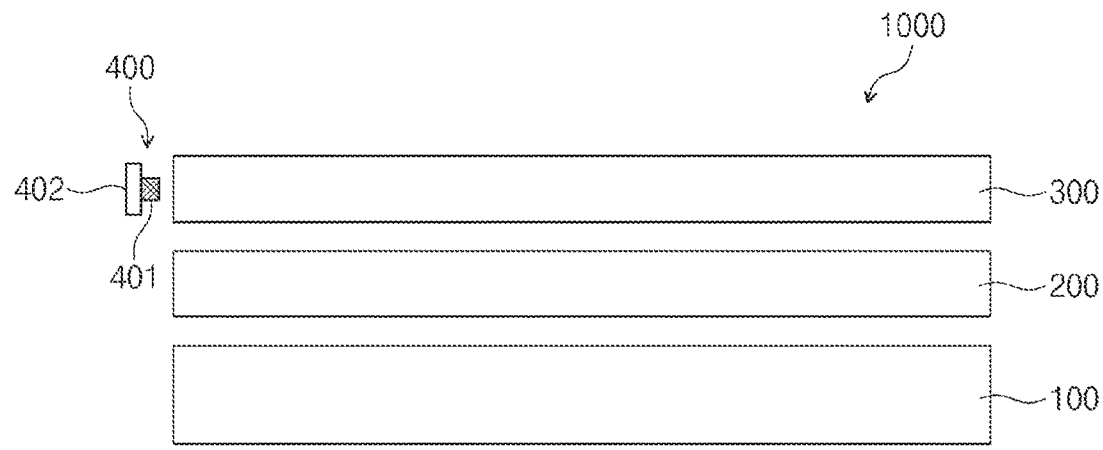
FIG. 1 is an exploded sectional view generally illustrating a display device according to some exemplary embodiments.
Figure 1:
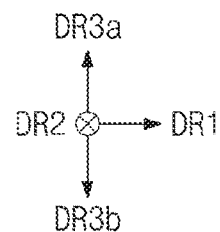

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some exemplary embodiments. Therefore, unless otherwise specified, the features, components, modules, layers, films, panels, regions, aspects, etc. (hereinafter individually or collectively referred to as an "element" or "elements"), of the various illustrations may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. As such, the sizes and relative sizes of the respective elements are not necessarily limited to the sizes and relative sizes shown in the drawings. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element is referred to as being "on," "connected to," or "coupled to" another element, it may be directly on, connected to, or coupled to the other element or intervening elements may be present. When, however, an element is referred to as being "directly on," "directly connected to," or "directly coupled to" another element, there are no intervening elements present. Other terms and/or phrases used to describe a relationship between elements should be interpreted in a like fashion, e.g., "between" versus "directly between," "adjacent" versus "directly adjacent," "on" versus "directly on," etc. Further, the term "connected" may refer to physical, electrical, and/or fluid connection. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one element's relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to cross-sectional views, perspective views, plan views, and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. In this manner, regions illustrated in the drawings may be schematic in nature and shapes of these regions may not reflect the actual shapes of regions of a device, and, as such, are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

As customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the inventive concepts. Further, the blocks, units, and/or modules of some exemplary embodiments may be physically combined into more complex blocks, units, and/or modules without departing from the inventive concepts.

FIG. 1 is a sectional view generally illustrating a display device according to some exemplary embodiments.

Referring to FIG. 1, a display device 1000 may be used for large-sized electronic devices (e.g., television sets, monitors, outdoor billboards, etc.), or small- or medium-sized electronic devices (e.g., personal computers, notebook computers, personal digital assistants, car navigation systems, gaming machines, portable electronic devices, cameras, etc.). It is contemplated, however, that the aforementioned electronic devices are only a few examples, and other electronic devices may be used in association with the inventive concepts.

The display device 1000 may include a display panel 100, an optical member 200, a light guide plate 300, and a light source unit 400.

The display panel 100 may be configured to produce an image based on image data input thereto. In some exemplary embodiments, the display panel 100 may be a light-receiving type display panel. For example, the display panel 100 may be a liquid crystal display panel, but exemplary embodiments are not limited thereto.

The optical member 200 may be provided on the display panel 100. For instance, the optical member 200 may be disposed between the display panel 100 and the light guide plate 300. The optical member 200 may be configured to adjust a traveling path of light to be incident to the optical member 200. For example, the optical member 200 may be configured to allow incident light to be emitted in a vertical direction. Here, the vertical direction may be perpendicular to a display surface (e.g., a top or bottom surface) of the display panel 100. For example, in the case where the display panel 100 is configured to display an image on the display surface defined by two different directions (hereinafter a first direction DR1 and a second direction DR2), the vertical direction may be perpendicular to the display surface and may be parallel to a third direction DR3b that is directed toward the display panel 100.

The light guide plate 300 may be provided on the optical member 200 such that the optical member 200 is disposed between the light guide plate 300 and the display panel 100.

Various materials may be used for the light guide plate 300, and exemplary embodiments are not limited to an example in which a specific material is used for the light guide plate 300. For example, the light guide plate 300 may include glass and/or plastic. In the case where the light guide plate 300 includes glass, it may be possible to prevent the light guide plate 300 from being deformed or discolored even when the light guide plate 300 is exposed to moisture and/or direct sunlight. This may make it possible to improve durability and reliability of the light guide plate 300. In the case where the light guide plate 300 includes plastic, it may be possible to improve optical transmittance of the light guide plate 300.

The light source unit 400 may be placed on at least one side surface of the light guide plate 300. The light source unit 400 may include a light source 401 and a printed circuit board 402. The light source 401 may be mounted on the printed circuit board 402, and a driving voltage provided from the printed circuit board 402 may be applied to the light source 401. In some exemplary embodiments, a plurality of the light sources 401 arranged in the second direction DR2 may be provided on the printed circuit board 402.

The light guide plate 300 may be configured to guide light, which is provided from the light source unit 400, toward the display panel 100. The optical member 200 may be provided between the display panel 100 and the light guide plate 300. The optical member 200 may be configured to allow light, which is incident into the optical member 200 through the light guide plate 300, to travel toward the display panel 100.

The display panel 100 may block an incident light or may allow for transmission of the incident light when an image is displayed on the display panel 100. The display panel 100 may be a transmissive display panel, a reflective display panel, or a double-sided display panel.

The light guide plate 300, the optical member 200, and the display panel 100 may be sequentially arranged in the third direction DR3b. In the case where the display panel 100 is a transmissive display panel, the display panel 100 may be configured to provide an image in the third direction DR3b. The third direction DR3b may be a direction away from the light guide plate 300. In the case where the display panel 100 is a reflective display panel, the display panel 100 may be configured to provide an image in a third direction DR3a that is directed opposite to the third direction DR3b. The third direction DR3a may be directed toward the light guide plate 300. In the case where the display panel 100 is a double-sided display panel, the display panel 100 may be configured to provide an image in the two opposite third directions DR3a and DR3b.

Figure 2:
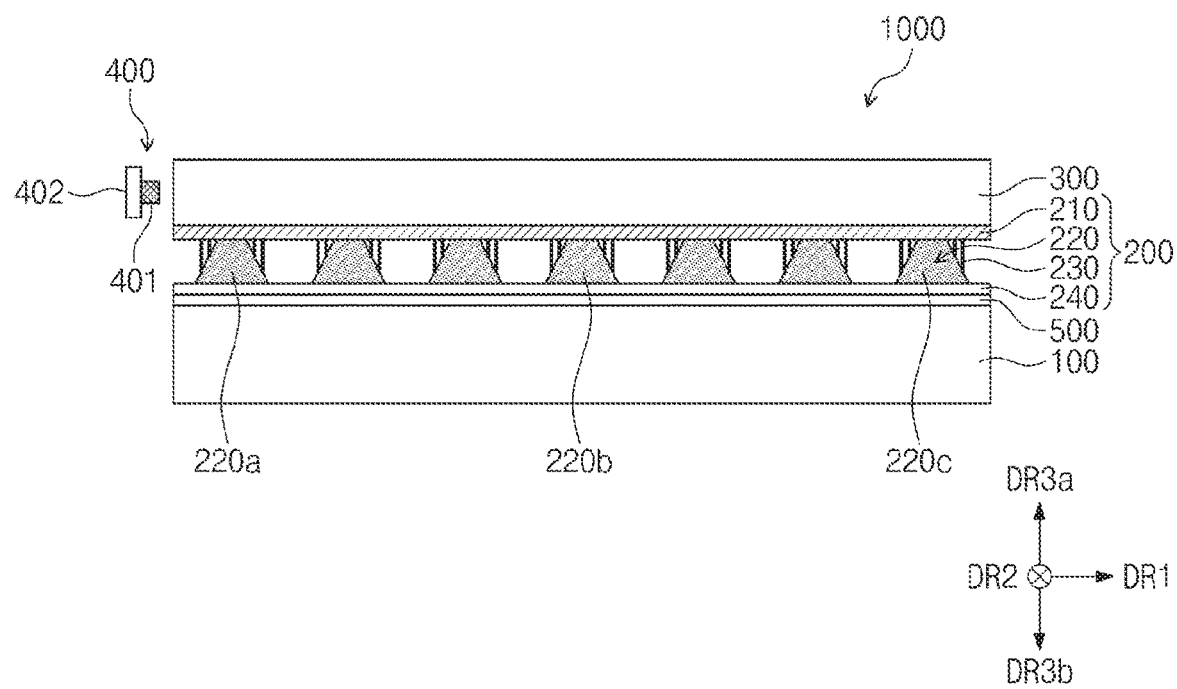
FIG. 2 is a sectional view of a display device according to some exemplary embodiments.
Figure 2:
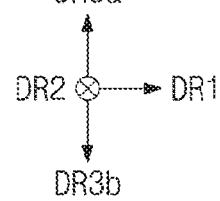
Figure 3:
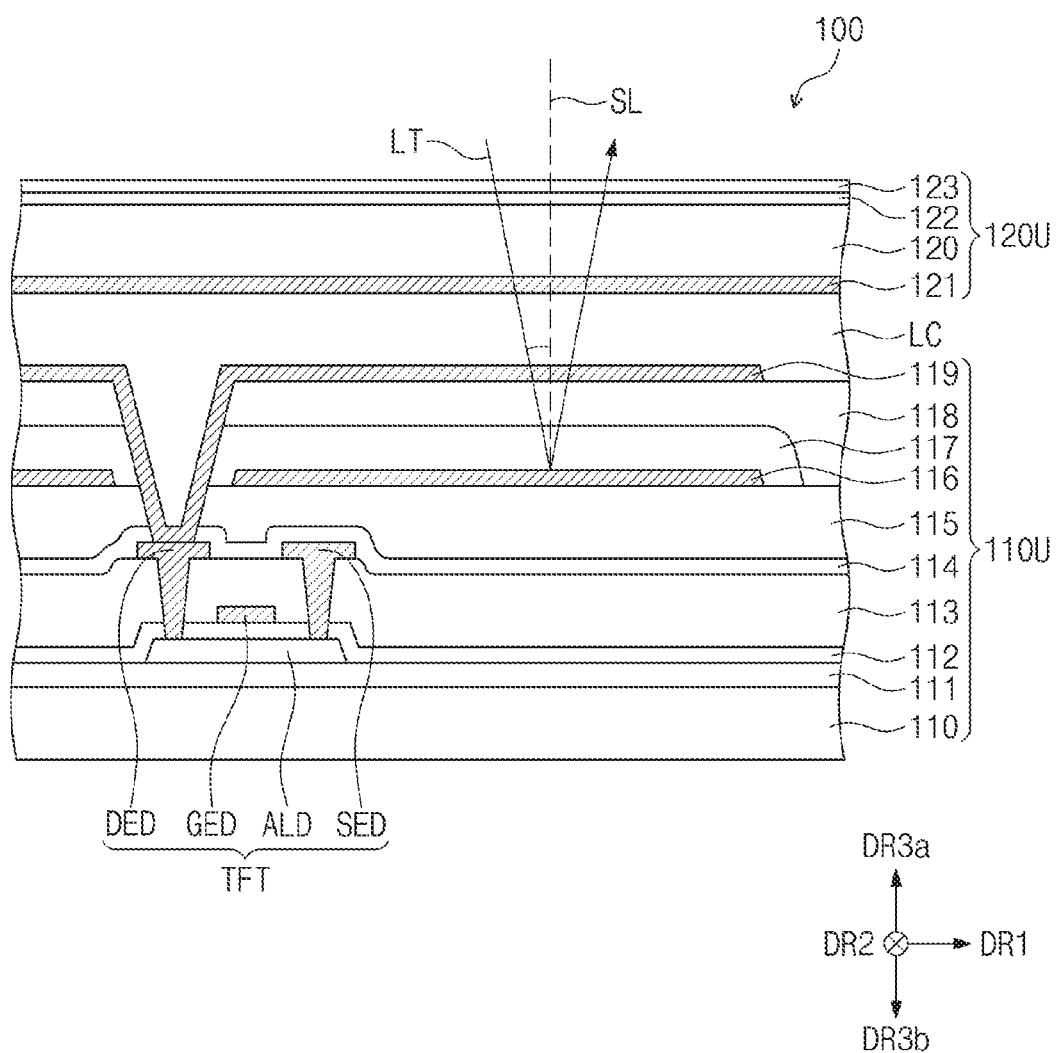
FIG. 3 is a sectional view of the display panel shown in FIG. 2 according to some exemplary embodiments.

FIG. 2 is a sectional view of a display device according to some exemplary embodiments. FIG. 3 is a sectional view of the display panel shown in FIG. 2 according to some exemplary embodiments. Hereinafter, an example in which the display panel 100 is a reflective display panel will be described with reference to FIGS. 2 and 3.

The display panel 100 may include a first substrate unit 110U, a second substrate unit 120U, and a liquid crystal layer LC.

The liquid crystal layer LC may be provided between the first and second substrate units 110U and 120U. The liquid crystal layer LC may include a plurality of liquid crystal molecules (not shown) whose arrangement directions are changed by an electric field generated between the first and second substrate units 110U and 120U.

The first substrate unit 110U may include a first base substrate 110, a transistor TFT, a plurality of insulating layers 111, 112, 113, 114, 115, and 118, a reflection layer 116, a color filter layer 117, and a pixel electrode 119.

The first base substrate 110 may be a silicon substrate, a plastic substrate, a glass substrate, an insulating film, or a stack including a plurality of insulating layers. The first base substrate 110 may be rigid or flexible.

A first insulating layer 111 may be provided on the first base substrate 110. The first insulating layer 111 may include a barrier layer, a buffer layer, or a multi-layered structure, in which the barrier layer and the buffer layer are stacked. The barrier layer may be configured to prevent a contamination material from entering another device (e.g., the transistor TFT), which is located thereon, through the first base substrate 110. The buffer layer may be used to improve an adhesion strength between the first base substrate 110 and a semiconductor pattern ALD of the transistor TFT. In the case where the first insulating layer 111 includes both of the barrier layer and buffer layer, the buffer layer may be provided on the barrier layer, and the barrier layer may be provided between the buffer layer and the first base substrate 110.

The transistor TFT may be provided on the first insulating layer 111. The transistor TFT may include a semiconductor pattern ALD, a control electrode GED, a first electrode SED, and a second electrode DED.

The semiconductor pattern ALD may be provided on the first insulating layer 111. The semiconductor pattern ALD may be formed of or include at least one of amorphous silicon, polysilicon, and metal oxide semiconductor materials.

A second insulating layer 112 may be provided on the semiconductor pattern ALD. The second insulating layer 112 may include at least one inorganic thin layer. The second insulating layer 112 may include silicon oxide, silicon nitride, and/or the like.

The control electrode GED may be provided on the second insulating layer 112. A third insulating layer 113 may be provided on the control electrode GED to cover the control electrode GED. The third insulating layer 113 may include at least one inorganic thin layer. The third insulating layer 113 may include silicon oxide, silicon nitride, and/or the like.

The first electrode SED and the second electrode DED may be provided on the third insulating layer 113. Through holes may be provided in the second insulating layer 112 and the third insulating layer 113, and a conductive material may be provided in the through holes. Each of the first and second electrodes SED and DED may be electrically connected to the semiconductor pattern ALD through the conductive material. The conductive material may be formed during a process of forming the first electrode SED and the second electrode DED.

A fourth insulating layer 114 may be provided on the third insulating layer 113 to cover the first electrode SED and the second electrode DED. The fourth insulating layer 114 may be a passivation layer. The fourth insulating layer 114 may include at least one inorganic thin layer and may be formed of or include, for example, at least one of silicon oxide or silicon nitride.

A fifth insulating layer 115 may be provided on the fourth insulating layer 114. The fifth insulating layer 115 may be formed of or include an organic material and may be provided to have a flat top surface. In some exemplary embodiments, at least one of the first to fifth insulating layers 111, 112, 113, 114, and 115 may be omitted.

The reflection layer 116 may be provided on the fifth insulating layer 115. The reflection layer 116 may be formed of or include at least one of optically reflective materials. The reflection layer 116 may be formed of or include, for example, at least one of metallic materials (e.g., aluminum, silver, etc.).

The color filter layer 117 may be provided on the reflection layer 116. Light LT incident to the color filter layer 117 may be reflected by the reflection layer 116 and may be emitted to the outside through the color filter layer 117.

A sixth insulating layer 118 may be provided on the color filter layer 117. The sixth insulating layer 118 may include an organic layer or an inorganic layer.

The pixel electrode 119 may be provided on the sixth insulating layer 118. The pixel electrode 119 may be a transparent electrode. For example, the pixel electrode 119 may include at least one of transparent conductive oxide materials (e.g., indium tin oxide (ITO), indium zinc oxide (IZO), aluminum zinc oxide (AZO), etc.).

The second substrate unit 120U may include a second base substrate 120, a common electrode 121, a phase difference (or delay) layer 122, and a polarizer 123.

The second base substrate 120 may be a transparent substrate. The second base substrate 120 may be a silicon substrate, a plastic substrate, a glass substrate, an insulating film, or a stack including a plurality of insulating layers. The second base substrate 120 may be rigid or flexible.

The common electrode 121 may be provided on a surface of the second base substrate 120. The common electrode 121 may be provided between the second base substrate 120 and the liquid crystal layer LC. The common electrode 121 and the pixel electrode 119 may be used to produce an electric field, and the electric field may be used to change the arrangement directions of the liquid crystal molecules.

In some exemplary embodiments, the first and second substrate units 110U and 120U may be provided to have a sectional structure shown in FIG. 3, but the display panel 100 may have a layer structure different from that shown in FIG. 3. For example, in some exemplary embodiments, the common electrode 121 may be included in the first substrate unit 110U, not in the second substrate unit 120U. In some exemplary embodiments, the color filter layer 117 may be included in the second substrate unit 120U, not in the first substrate unit 110U.

The phase difference layer 122 may be provided on an opposite surface of the second base substrate 120 such that the second base substrate 120 is disposed between the phase difference layer 122 and the common electrode 121. The polarizer 123 may be provided on the phase difference layer 122. The polarizer 123 may be configured to extract a linearly polarized light from an external light incident from the outside. The phase difference layer 122 may be configured to convert a linearly polarized light to a circularly polarized light. In the display panel 100, the circularly polarized light may be reflected by the reflection layer 116 and may be emitted to the outside through the phase difference layer 122 and the polarizer 123. In some exemplary embodiments, the circularly polarized light may not pass through the phase difference layer 122 and the polarizer 123 and may become extinct in the display panel 100.

The display panel 100 may be configured to display an image using light (e.g., natural light or artificial light) incident from the outside. In the case of a reflective display panel using natural light, the display panel 100 may consume less power than that in the transmissive display panel.

The display device 1000 may further include the optical member 200, the light guide plate 300, and the light source unit 400. In this case, the display device 1000 may be used to display an image in a dark environment.

The optical member 200 may be provided on the display panel 100, the light guide plate 300 may be provided on the optical member 200, and the light source unit 400 may be provided on at least one side surface of the light guide plate 300.

The optical member 200 and the display panel 100 may be coupled to each other by an adhesive member 500. The adhesive member 500 may be an organic adhesive layer, such as an optically clear adhesive (OCA) film, an optically clear resin (OCR), a pressure sensitive adhesive (PSA) film, etc. The organic adhesive layer may be formed of or include an adhesive material, such as polyurethane, polyacrylic, polyester, polyepoxy, polyvinyl acetate, and/or the like. In some exemplary embodiments, the adhesive member 500 may be omitted.

FIG. 3 shows a propagation path of light LT and an imaginary line SL parallel to the third direction DR3a or DR3b. In a case where the propagation path of the light LT is parallel to the imaginary line SL, the display panel 100 may have an increased contrast ratio and an improved color reproduction property. In this sense, the optical member 200 may be configured to allow the light LT to be incident into the display panel 100 in a direction parallel to the third direction DR3a or DR3b.

The optical member 200 may include an interconnection layer 210, an optical pattern unit 220, pattern shaping wires 230, and a base film 240.

The interconnection layer 210 may include signal lines, to which a control voltage from the outside is applied. The interconnection layer 210 may be directly formed on a surface of the light guide plate 300; however, exemplary embodiments are not limited thereto. For example, the interconnection layer 210 may be formed on a film, and the film may be attached to the light guide plate 300.

The optical pattern unit 220 may be provided on a surface of the interconnection layer 210. The optical pattern unit 220 may include optical patterns 220a, 220b, and 220c. In FIG. 2, the optical patterns 220a, 220b, and 220c may be arranged in order of distance from the light source unit 400. The optical patterns 220a, 220b, and 220c may be formed of or include an elastic material. The optical patterns 220a, 220b, and 220c may be formed of or include an elastomer. For example, the elastomer may include polydimethylsiloxane (PDMS).

As shown in FIG. 2, each of the optical patterns 220a, 220b, and 220c may be provided to have a trapezoidal shape when viewed in a sectional view. The shapes of the optical patterns 220a, 220b, and 220c may be variously changed as long as the optical patterns 220a, 220b, and 220c allow an incident light to travel in the direction DR3a or DR3b or along a path perpendicular to the display panel 100. For example, each of the optical patterns 220a, 220b, and 220c may have a curved lens shape or a triangular shape when viewed in a sectional view.

The pattern shaping wires 230 may be connected to each of the optical patterns 220a, 220b, and 220c. In other words, a plurality of pattern shaping wires 230 may be connected to a single optical pattern. In a case where a control voltage from the interconnection layer 210 is applied to the pattern shaping wires 230, the control voltage may be used to change a shape of the optical pattern connected to the pattern shaping wires 230.

The pattern shaping wires 230 may be formed of or include a material whose shape can be changed by external stimulation. The pattern shaping wires 230 may include an electroactive polymer (EAP). The electroactive polymer may be a polymeric material that can be deformed by an electric stimulation. For example, the electroactive polymer may include a dielectric electroactive polymer (dielectric EAP), an electrostatic Graft elastomer, an electrostrictive paper, an electro-viscoelastic elastomer, a ferroelectric polymer, a liquid crystal elastomer, carbon nanotube, a conductive polymer, electrorheological fluids, an ionic polymer gel, an ionic polymer metal composite (IPMC), or a dielectric elastomer.

Figure 4A:
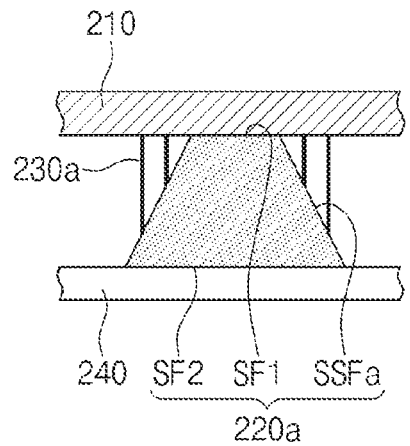
FIGS. 4A, 4B, and 4C are enlarged sectional views each illustrating an example of optical patterns shown in FIG. 2 according to some exemplary embodiments.
Figure 4B:
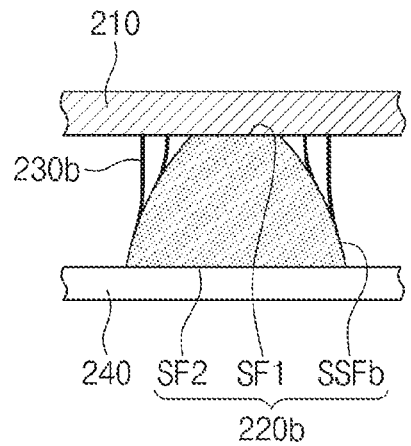
Figure 4B:
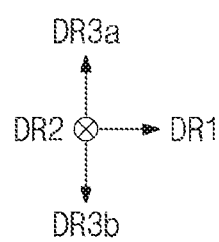
Figure 4B:
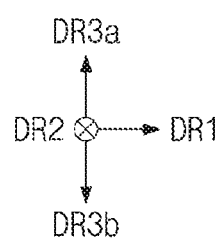
Figure 4C:
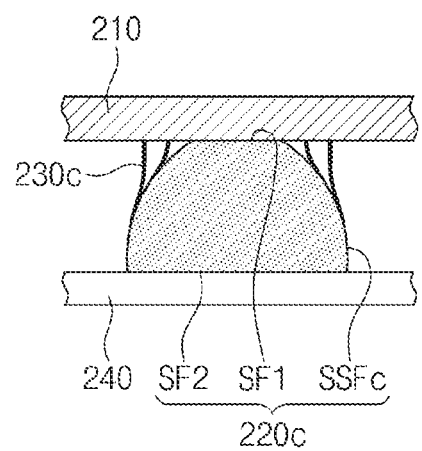
Figure 4C:
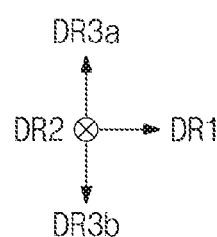

FIGS. 4A, 4B, and 4C are enlarged sectional views each illustrating an example of optical patterns shown in FIG. 2 according to some exemplary embodiments. FIGS. 4A, 4B, and 4C illustrate some examples of deformation of optical patterns that occurs when a voltage is applied to at least one of pattern shaping wires 230a, 230b, and 230c.

In FIGS. 4A, 4B, and 4C, the optical patterns 220a, 220b, and 220c will be referred to as the first, second, and third optical patterns 220a, 220b, and 220c in order of distance from the light source unit 400 (e.g., see FIG. 2). Each of the first, second, and third optical patterns 220a, 220b, and 220c may include a first surface SF1 facing the light guide plate 300 (e.g., see FIG. 2) and a second surface SF2 facing the display panel 100 (e.g., see FIG. 2). The first surface SF1 may have an area that is smaller than an area of the second surface SF2.

The first optical pattern 220a may include a first side surface SSFa connecting the first surface SF1 to the second surface SF2. The second optical pattern 220b may include a second side surface SSFb connecting the first surface SF1 to the second surface SF2. The third optical pattern 220c may include a third side surface SSFc connecting the first surface SF1 to the second surface SF2. When the first, second, and third optical patterns 220a, 220b, and 220c are in the undeformed state, each of the first, second, and third optical patterns 220a, 220b, and 220c may have a trapezoidal shape when viewed in a sectional view.

The pattern shaping wires 230a, 230b, and 230c may include the first pattern shaping wires 230a connected to the first optical pattern 220a, the second pattern shaping wires 230b connected to the second optical pattern 220b, and the third pattern shaping wires 230c connected to the third optical pattern 220c.

The first pattern shaping wires 230a may be connected to the first side surface SSFa and the interconnection layer 210. The second pattern shaping wires 230b may be connected to the second side surface SSFb and the interconnection layer 210. The third pattern shaping wires 230c may be connected to the third side surface SSFc and the interconnection layer 210.

An amount of light incident into the first to third optical patterns 220a, 220b, and 220c may vary depending on a distance from the light source unit 400 (e.g., see FIG. 2). To uniformly provide light onto the entire top surface of the display panel 100, a shape of at least one of the first to third optical patterns 220a, 220b, and 220c may be changed by the first to third pattern shaping wires 230a, 230b, and 230c. Here, the term "shape" may refer to a curvature or surface area of each of the first to third optical patterns 220a, 220b, and 220c, and for the purposes of this disclosure, the curvature may be given as the reciprocal of curvature radius.

The shape of each of the first to third optical patterns 220a, 220b, and 220c may vary depending on a distance from the light source unit 400. For example, the curvature and the surface area of the second side surface SSFb of the second optical pattern 220b may be greater than the curvature and surface area of the first side surface SSFa of the first optical pattern 220a respectively and may be less than the curvature and surface area of the third side surface SSFc of the third optical pattern 220c respectively.

The curvature or surface area of each of the first to third optical patterns 220a, 220b, and 220c may be controlled by adjusting a control voltage applied to the first to third pattern shaping wires 230a, 230b, and 230c. For example, a control voltage applied to the third pattern shaping wires 230c may be higher than a control voltage applied to the second pattern shaping wires 230b. The first pattern shaping wires 230a may not be applied with a control voltage or may be applied with a control voltage that is lower than a control voltage applied to the second pattern shaping wires 230b.

When the control voltage is applied to each of the second and third pattern shaping wires 230b and 230c, a portion of each of the second and third pattern shaping wires 230b and 230c may be shrunken by an electric stimulation and another portion may be expanded by the electric stimulation. In other words, the second and third pattern shaping wires 230b and 230c may have a curved shape, and this may make it possible to change shapes of the second and third optical patterns 220b and 220c connected to the second and third pattern shaping wires 230b and 230c.

In the case where the second and third optical patterns 220b and 220c are deformed to have an increased curvature, it may be possible to increase surface areas of the second and third optical patterns 220b and 220c, to which light is incident. Thus, the second and third optical patterns 220b and 220c may have improved light-emitting efficiency. That is, even when an amount of light incident into each of the second and third optical patterns 220b and 220c is less than an amount of light incident into the first optical pattern 220a, it may be possible to reduce a difference in an amount of light to be incident into the display panel 100 through the first, second, and third optical patterns 220a, 220b, and 220c.

Figure 5:
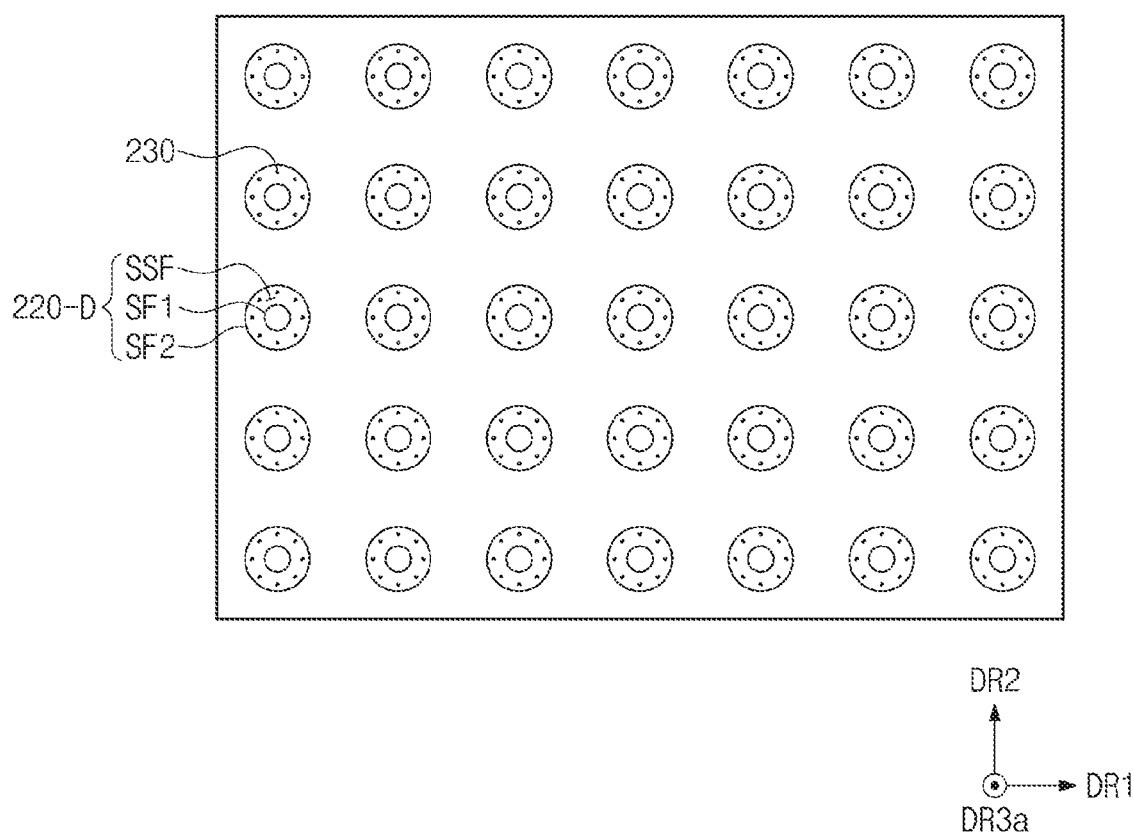
FIG. 5 is a plan view illustrating an optical member according to some exemplary embodiments.

FIG. 5 is a plan view illustrating an optical member according to some exemplary embodiments.

Referring to FIG. 5, each of optical patterns 220-D may include the first surface SF1, the second surface SF2, and a side surface SSF. When viewed in a plan view, each of the first surface SF1 and the second surface SF2 may have a circular shape. When viewed in a plan view, the optical patterns 220-D may be shaped like an isolated pattern or may have a dot shape. Here, the plan view may be viewed in the third direction DR3a of a plane including or parallel to the first direction DR1 and the second direction DR2. In some exemplary embodiments, at least one of the first surface SF1 and the second surface SF2 may have a polygonal shape when viewed in a plan view.

The optical patterns 220-D may be arranged in substantially the same density or in a substantially uniform density. A distance between adjacent ones of the optical patterns 220-D may be uniform. In the case where the optical patterns 220-D are not arranged in the same density, there may be a difference in adhesive strength between a region having a high pattern density and another region having a low pattern density. However, according to some exemplary embodiments, since the optical patterns 220-D are arranged in a uniform density, the adhesive strength between the optical patterns 220-D and the base film 240 (e.g., see FIG. 2) may be uniform. Thus, it may be possible to prevent the base film 240 from being delaminated from the optical patterns 220-D by the difference in the adhesive strength.

The optical patterns 220-D and the base film 240 may be coupled to each other by an optically clear resin (OCR) (not shown). In some exemplary embodiments, the optical patterns 220-D may have a highly adhesive property, and in this case, the optical patterns 220-D may be directly attached to the base film 240.

The pattern shaping wires 230 may be connected to the side surface SSF of each of the optical patterns 220-D. FIG. 5 illustrates an example in which eight pattern shaping wires 230 are coupled to a single optical pattern, but exemplary embodiments are not limited thereto. For example, two or more pattern shaping wires 230 may be connected to each optical pattern. Further, as shown in FIG. 5, the eight pattern shaping wires 230 may be arranged to enclose the first surface SF1 when viewed in a plan view. However, eight pattern shaping wires may be additionally provided, and in some exemplary embodiments, the additional wires may be arranged in a region of the side surface SSF, which is located between the first surface SF1 and a region provided with the existing eight pattern shaping wires 230.

Figure 6:
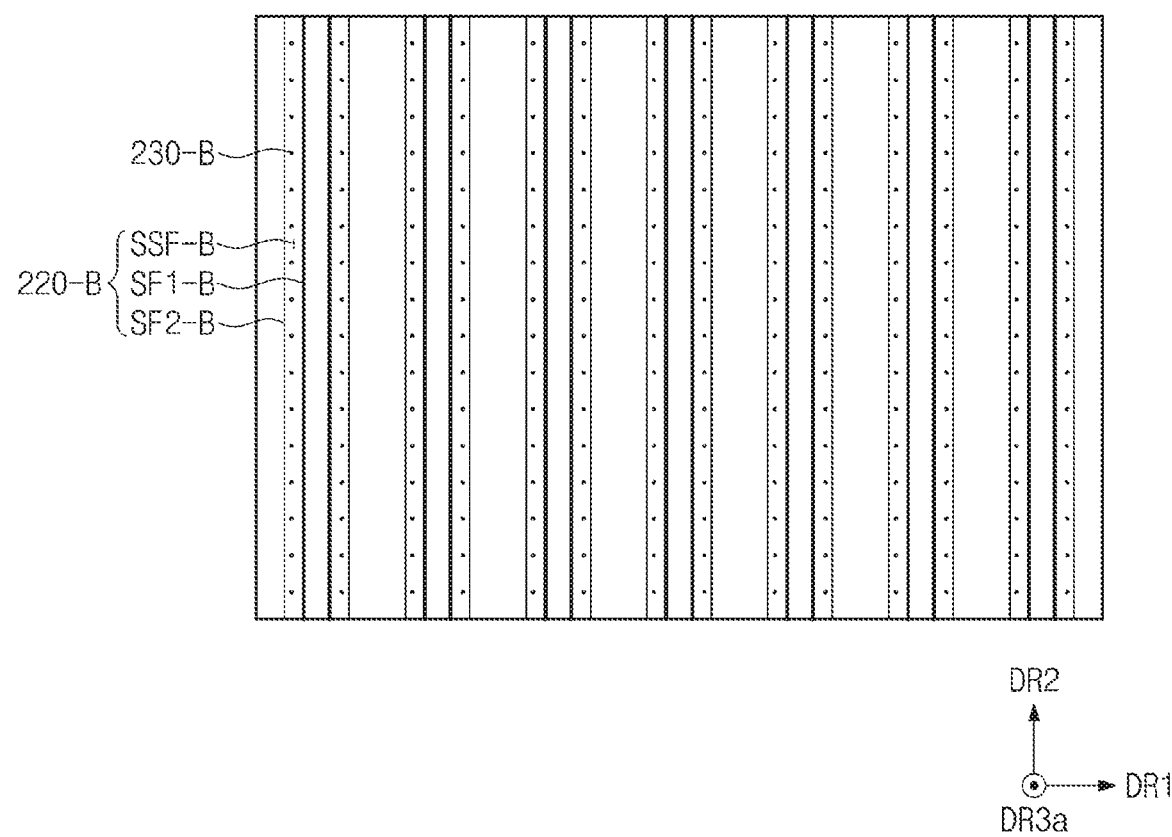
FIG. 6 is a plan view illustrating an optical member according to some exemplary embodiments.

FIG. 6 is a plan view illustrating an optical member according to some exemplary embodiments.

Referring to FIG. 6, each of optical patterns 220-B may include a first surface SF1-B, a second surface SF2-B, and a side surface SSF-B. When viewed in a plan view, each of the first surface SF1-B and the second surface SF2-B may have a bar shape extending in a direction. In other words, when viewed in a plan view, the optical patterns 220-B may have a bar shape. For instance, the optical patterns 220-B may extend in the second direction DR2 and may be arranged to be spaced apart from each other in the first direction DR1. The optical patterns 220-B may be arranged in such a way that the optical patterns 220-B are spaced apart from each other by the same distance.

Pattern shaping wires 230-B may be coupled to the side surface SSF-B of each of the optical patterns 220-B. The pattern shaping wires 230-B may be arranged in an extension direction of each of the optical patterns 220-B. FIG. 6 illustrates an example in which the pattern shaping wires 230-B coupled to the side surface SSF-B are arranged in a single column, and in some exemplary embodiments, the pattern shaping wires 230-B may be arranged to form a plurality of columns.

Figure 7:
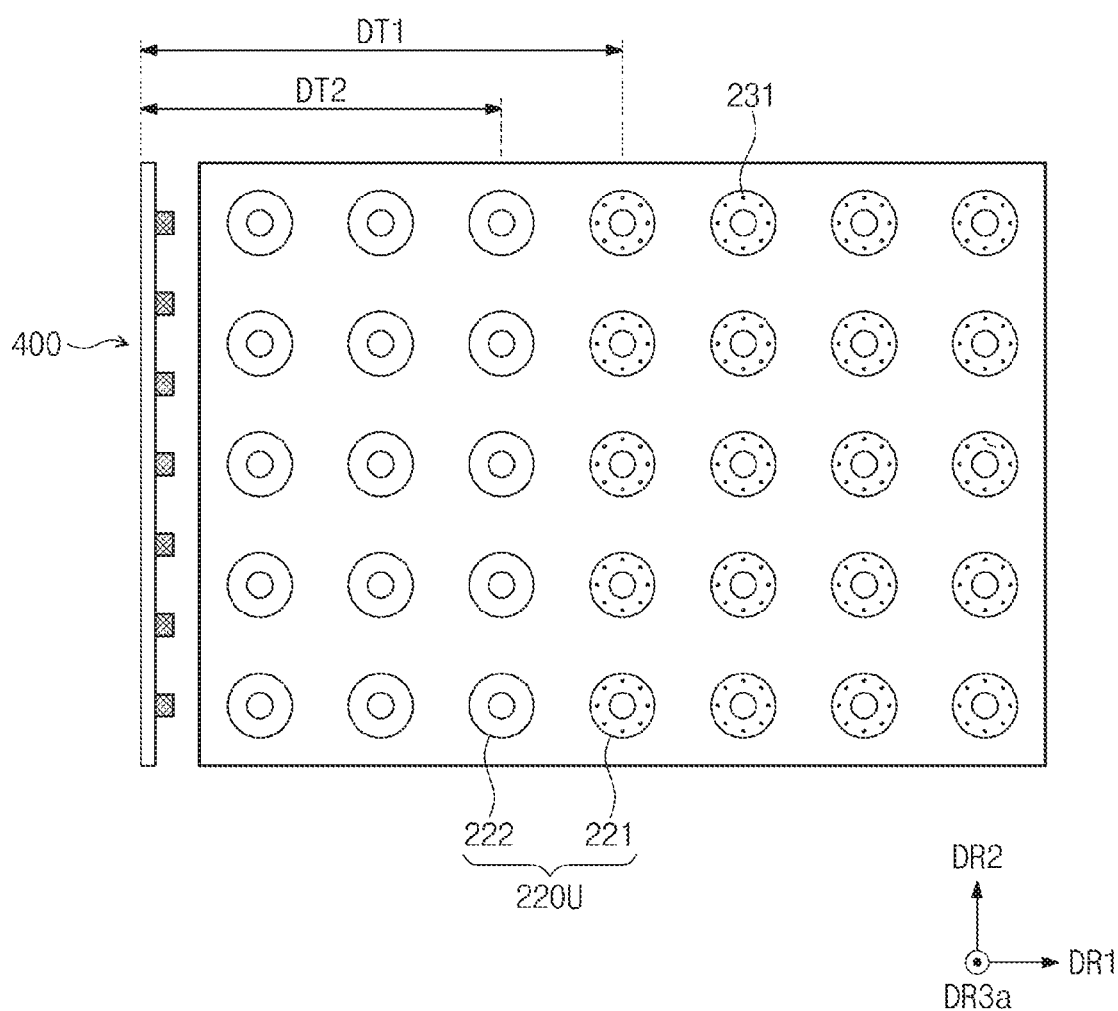
FIG. 7 is a plan view illustrating an optical member and a light source unit according to some exemplary embodiments.

FIG. 7 is a plan view illustrating an optical member and a light source unit according to some exemplary embodiments.

Referring to FIG. 7, an optical pattern unit 220U may include first optical patterns 221 and second optical patterns 222. A distance between the first optical patterns 221 and the light source unit 400 may be greater than a distance between the second optical patterns 222 and the light source unit 400.

For example, as shown in FIG. 7, the light source unit 400 may be spaced apart from one of the first optical patterns 221 closest thereto by a minimum first distance DT1, and the light source unit 400 may be spaced apart from one of the second optical patterns 222 farthest therefrom by a maximum second distance DT2. In this case, the minimum first distance DT1 may be greater than the maximum second distance DT2. Thus, a first distance between each of the first optical patterns 221 and the light source unit 400 may be greater than a second distance between any of the second optical patterns and the light source unit 400.

The first optical patterns 221 may be connected to first pattern shaping wires 231, respectively, whereas any of the second optical patterns 222 may not be connected to a pattern shaping wire. In other words, to adjust shapes of the first optical patterns 221, which are located farther from the light source unit 400 than the second optical patterns 222, the first pattern shaping wires 231 may be connected to only the first optical patterns 221.

Figure 8:
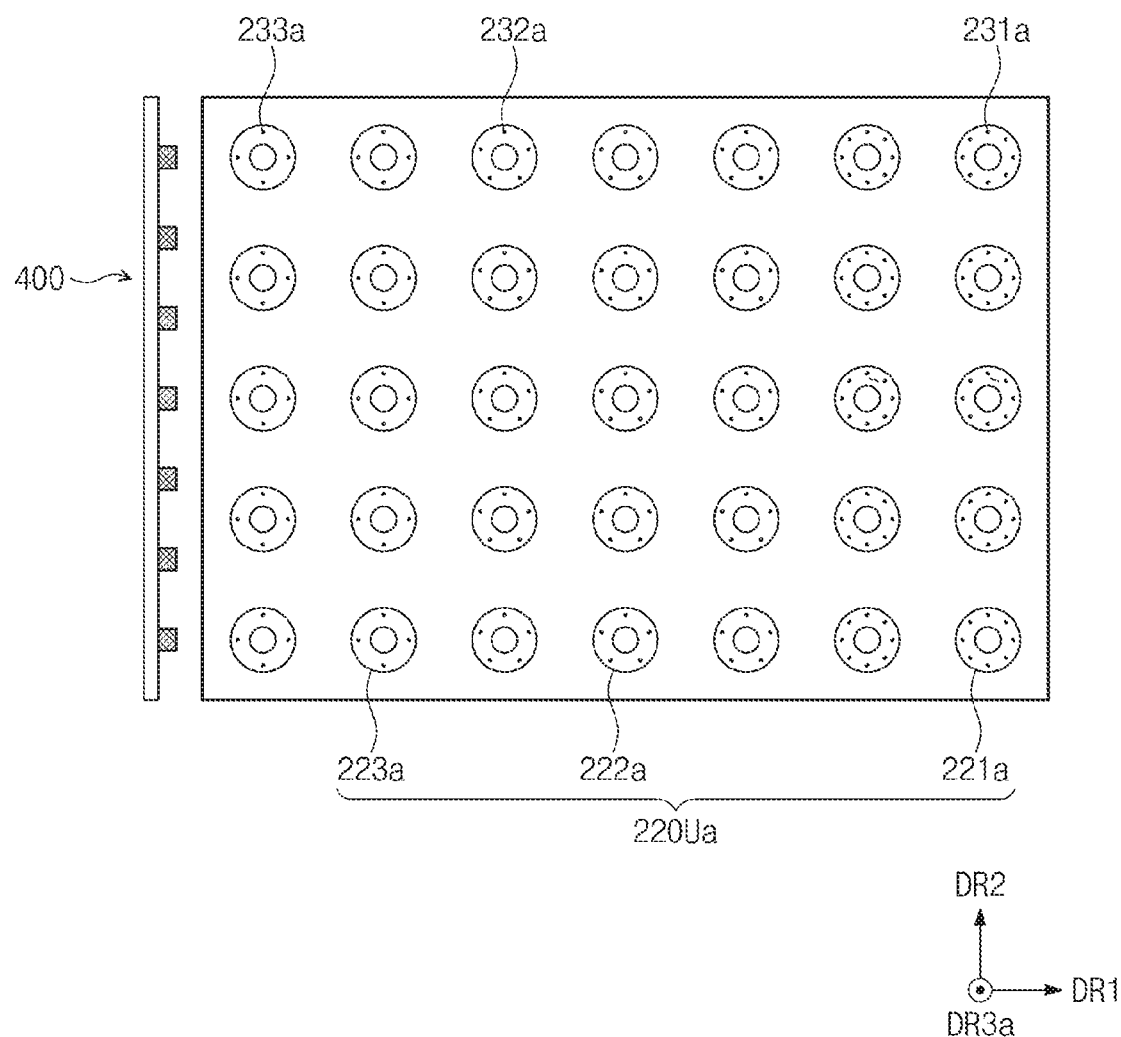
FIG. 8 is a plan view illustrating an optical member and a light source unit according to some exemplary embodiments.

FIG. 8 is a plan view illustrating an optical member and a light source unit is according to some exemplary embodiments.

Referring to FIG. 8, an optical pattern unit 220Ua may include first optical patterns 221a, second optical patterns 222a, and third optical patterns 223a.

The third optical patterns 223a, the second optical patterns 222a, and the first optical patterns 221a may be sequentially arranged in a direction away from the light source unit 400. That is, with respect to the first, second, and third optical patterns 221a, 222a, and 223a, the first optical patterns 221a may be farthest from the light source unit 400, the third optical patterns 223a may be closest from the light source unit 400, and the second optical patterns 222a may be located between the first and third optical patterns 221a and 223a.

The larger the distance from the light source unit 400, the smaller an amount of light to be incident into the optical pattern, and thus, to improve light-emitting efficiency, a curvature and surface area of an optical pattern may be increased. To this end, the more pattern shaping wires connected to the optical pattern, the easier it may be to change the shape of the optical pattern. Thus, the number of pattern shaping wires connected to each optical pattern may be increased in a direction away from the light source unit 400. This will be described in more detail below.

The first pattern shaping wires 231a may be connected to the first optical patterns 221a, respectively, the second pattern shaping wires 232a may be connected to the second optical patterns 222a, respectively, and the third pattern shaping wires 233a may be connected to the third optical patterns 223a, respectively.

In some exemplary embodiments, the number of the first pattern shaping wires 231a, the second pattern shaping wires 232a, and the third pattern shaping wires 233a respectively connected to the first, second, and third optical patterns 221a, 222a, and 223a may be different from each other. For example, the number of the first pattern shaping wires 231a may be greater than the number of the second pattern shaping wires 232a, and the number of the second pattern shaping wires 232a may be greater than the number of the third pattern shaping wires 233a.

Figure 9:
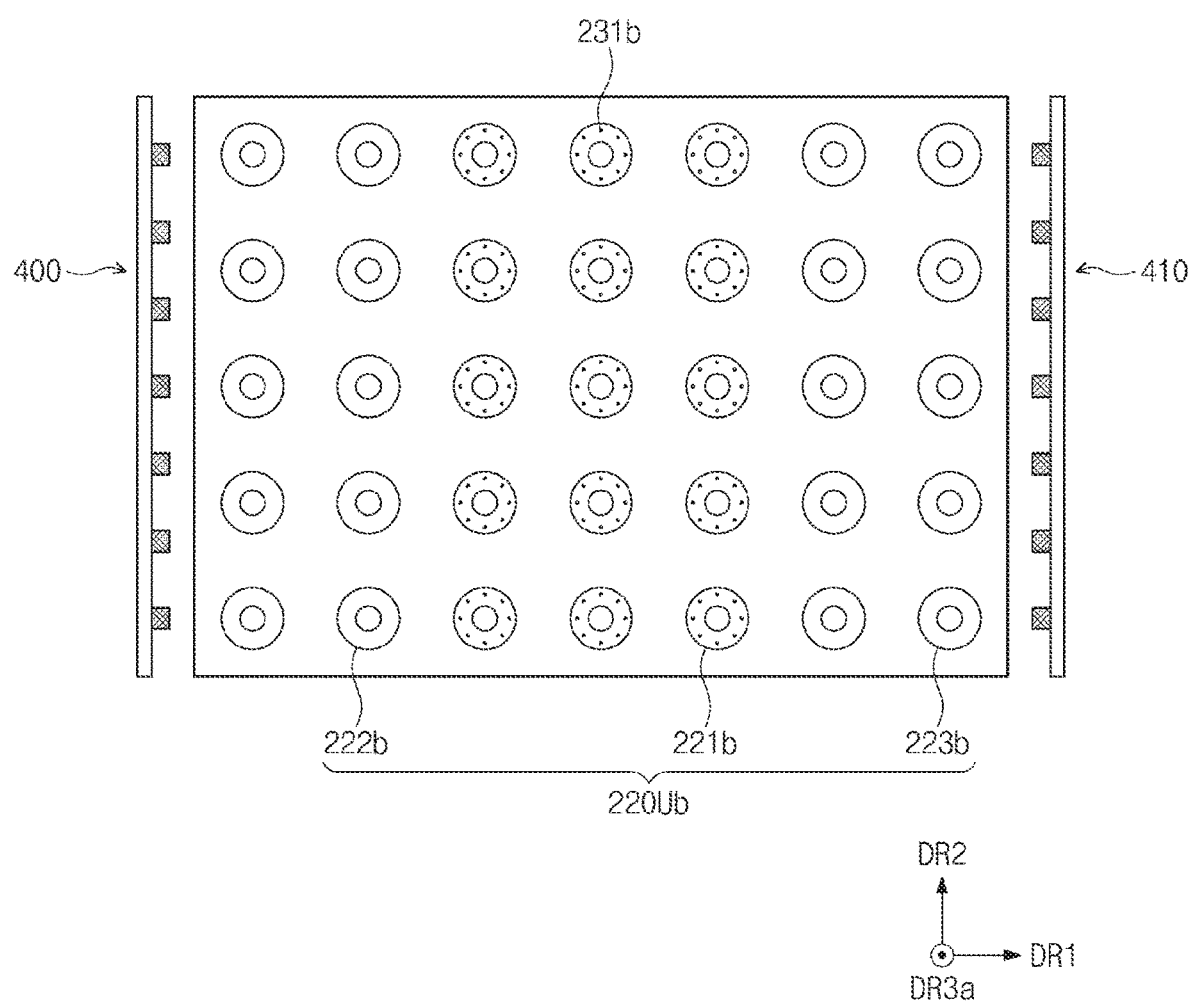
FIG. 9 is a plan view illustrating an optical member and a light source unit according to some exemplary embodiments.

FIG. 9 is a plan view illustrating an optical member and a light source unit according to some exemplary embodiments.

Examples having only one light source unit 400 have been described with respect to FIGS. 2, 7, and 8. Two light source units 400 and 410 may be provided in some exemplary embodiments, such as depicted in FIG. 9. One of the light source units will be referred to as the first light source unit 400, and the other of the light source units will be referred to a second light source unit 410. The first and second light source units 400 and 410 may be provided to face each other with the light guide plate 300 (e.g., see FIG. 2) interposed therebetween.

An optical pattern unit 220Ub may include first optical patterns 221b, second optical patterns 222b, and third optical patterns 223b. The second optical patterns 222b may be provided between the first optical patterns 221b and the first light source unit 400, and the third optical patterns 223b may be provided between the first optical patterns 221b and the second light source unit 410.

An amount of light to be incident into the first optical patterns 221b may be smaller as compared with the amount of light incident into the second and third optical patterns 222b and 223b. Thus, pattern shaping wires 231b may be connected to the first optical patterns 221b, respectively, to control a curvature or shape of each of the first optical patterns 221b.

Although not shown, in some exemplary embodiments, pattern shaping wires may also be connected to each of the second and third optical patterns 222b and 223b. The number of the pattern shaping wires connected to each of the second and third optical patterns 222b and 223b may be less than the number of the pattern shaping wires 231b connected to the first optical patterns 221b. This can also be appreciated based on the illustration in FIG. 8.

An exemplary method of manufacturing an optical member will be described in association with FIGS. 10A to 10F. Accordingly, FIGS. 10A to 10F are sectional views of an optical member at various stages of manufacture according to some exemplary embodiments. An element described with reference to FIG. 2 will be identified by the same reference number without repeating an overlapping description.

Figure 10A:
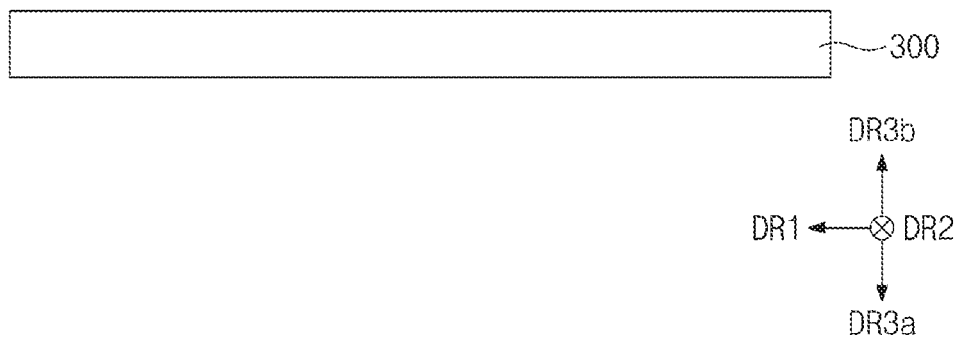
FIGS. 10A, 10B, 10C, 10D, 10E, and 10F are sectional views of an optical member at various stages of manufacture according to some exemplary embodiments.

Referring to FIG. 10A, a base layer 300 may be prepared. The base layer 300 may be, for example, the light guide plate 300 (e.g., see FIG. 2) or a transparent film. For the sake of simplicity, the description that follows will refer to an example in which the light guide plate 300 is used as the base layer. Although not shown, in a fabrication process, the light guide plate 300 may be disposed on a working substrate (not shown). In some exemplary embodiments, the working substrate may be removed after formation of the optical member.

Figure 10B:
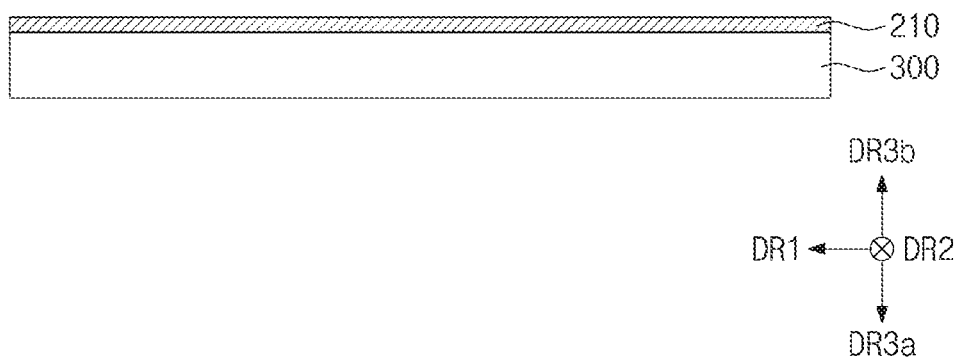

Referring to FIG. 10B, the interconnection layer 210 may be formed on the light guide plate 300. Although not shown, the interconnection layer 210 may include a pad, and the interconnection layer 210 may receive a control voltage from the outside through the pad.

Figure 10C:
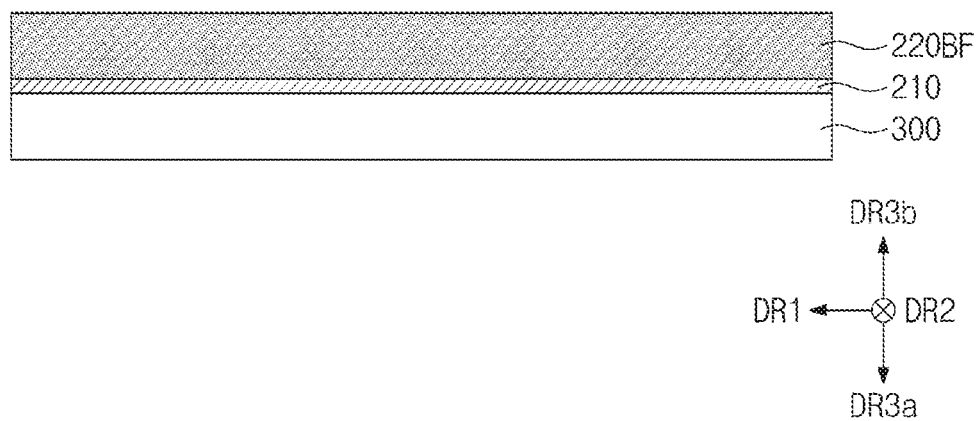

Referring to FIG. 10C, a preliminary layer 220BF may be formed on the interconnection layer 210. The preliminary layer 220BF may include an elastic material. For example, the preliminary layer 220BF may include polydimethylsiloxane (PDMS).

Figure 10D:
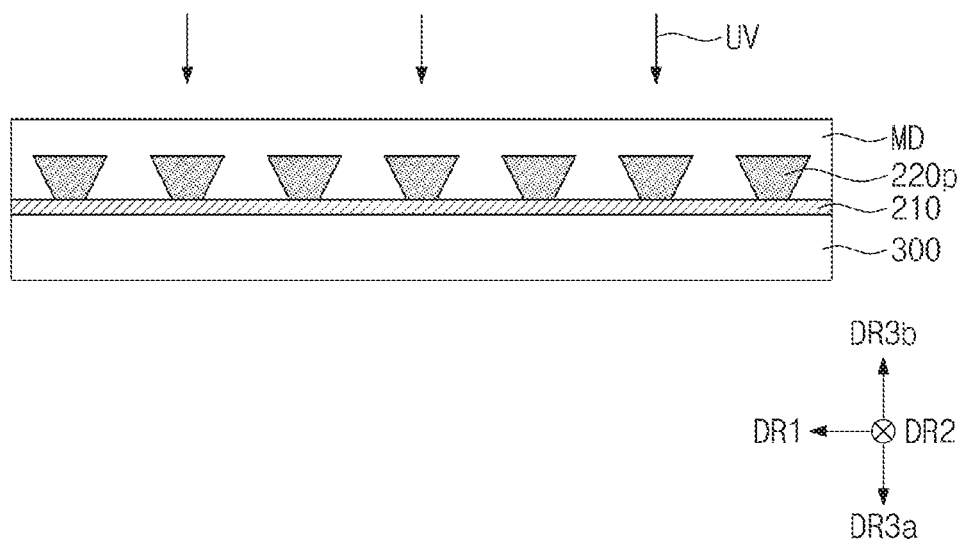

Referring to FIGS. 10C and 10D, an imprint mold MD may be used to pressure the preliminary layer 220BF. The imprint mold MD may be provided to have a pattern having a shape corresponding to a to-be-desired shape of an optical pattern.

If the preliminary layer 220BF is pressured using the imprint mold MD, optical patterns 220p may be formed. The optical patterns 220p may be hardened when the optical patterns 220p are pressured by the imprint mold MD. For example, ultra-violet light (UV) light or heat may be provided to the optical patterns 220p to harden the optical patterns 220p.

Figure 10E:
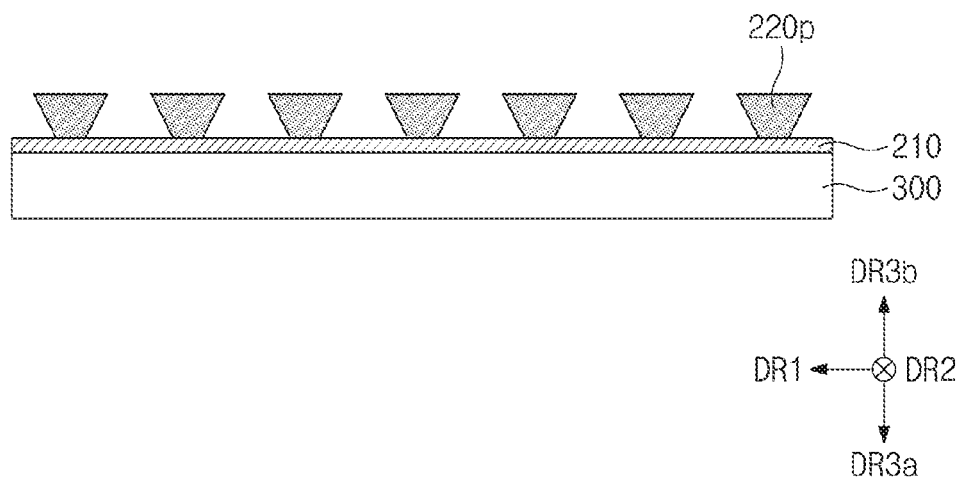

Referring to FIG. 10E, the imprint mold MD may be separated from the optical patterns 220p. The optical patterns 220p may have a reversed trapezoidal shape. Since the optical patterns 220p include an elastic material, the imprint mold MD may be easily separated from the optical patterns 220p.

Figure 10F:
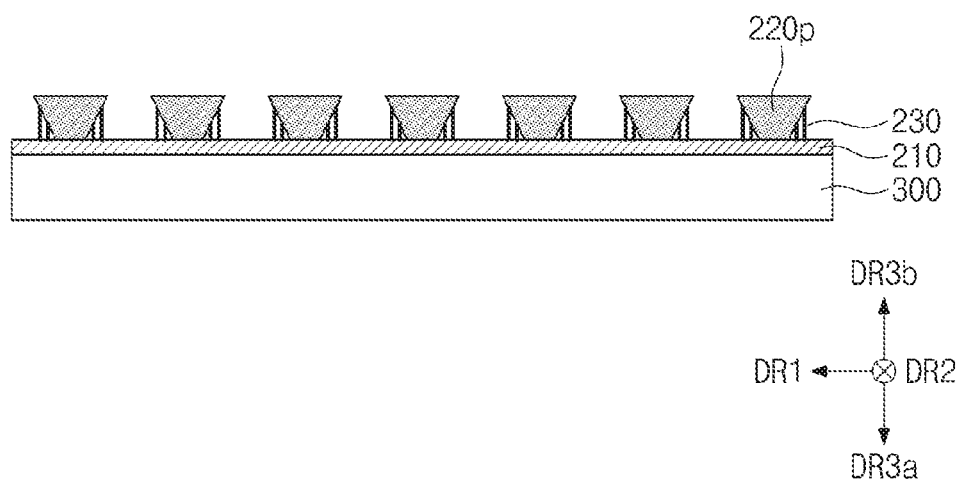

Referring to FIG. 10F, the pattern shaping wires 230 may be coupled to the optical patterns 220p, respectively. The pattern shaping wires 230 may also be coupled to the interconnection layer 210. A chemical treatment may be performed to couple the pattern shaping wires 230 to the optical patterns 220p and the interconnection layer 210. For example, the chemical treatment may include a surface treatment, which may be performed using a coupling agent, plasma, oxygen-plasma, or fluorine-plasma.

For example, in the case where the surface treatment is performed using a coupling agent, the coupling agent may include epoxy silane, amino silane, or titanate. The coupling agent of epoxy silane or amino silane may react with an elastomer, and the coupling agent of titanate may react with $H^+$ that exists on a surface of the pattern shaping wires 230 or the optical patterns 220p. In the case where the surface treatment using the coupling agent is performed on the pattern shaping wires 230 or the optical patterns 220p, it may be possible to change a surface state (e.g., surface roughness). The higher the surface roughness, the higher the adhesive strength. This process may be used to attach the pattern shaping wires 230 to the optical patterns 220p.

According to various exemplary embodiments, a pattern shaping wire may be provided to control a curvature or surface area of one or more optical patterns of an optical member. Thus, the optical member may be configured to emit a uniform amount of light to a display panel via manipulation of one or more of the optical patterns via the one or more pattern shaping wires. Accordingly, it may be possible to improve a display quality of a display device.

In addition, the optical patterns of the optical member may be arranged in a uniform density. Thus, it may be possible to more easily perform a process of forming the optical patterns. Furthermore, in the case where the optical patterns are arranged in a uniform density, the optical patterns may be attached to a base film with a uniform adhesive strength. Hence, it may be possible to prevent the optical patterns from being delaminated, and thereby, to improve reliability of the display device.

Although certain exemplary embodiments and implementations have been described herein, other embodiments and modifications will be apparent from this description. Accordingly, the inventive concepts are not limited to such embodiments, but rather to the broader scope of the accompanying claims and various obvious modifications and equivalent arrangements as would be apparent to one of ordinary skill in the art.

What is claimed is:

1. A display device, comprising:
a display panel;
a light guide plate on the display panel;

a first light source unit configured to provide light to a side surface of the light guide plate; and
an optical member between the light guide plate and the display panel,
wherein the optical member comprises:
an interconnection layer;
an optical pattern unit comprising first optical patterns and second optical patterns on a surface of the interconnection layer;
first pattern shaping wires configured to receive a control voltage from the interconnection layer and to control a shape of each of the first optical patterns via the control voltage; and
second pattern shaping wires configured to control a shape of each of the second optical patterns,
wherein each of the first optical patterns is connected to a respective some of the first pattern shaping wires,
wherein each of the second optical patterns is connected to a respective some of the second pattern shaping wires, and
wherein a number of the second pattern shaping wires connected to each of the second optical patterns is less than a number of the first pattern shaping wires connected to each of the first optical patterns.

2. The display device of claim 1, wherein:
each of the first optical patterns has an isolated pattern shape when viewed in a plan view and has a trapezoidal shape when viewed in a sectional view; and
the first pattern shaping wires are connected to side surfaces of the first optical patterns.

3. The display device of claim 1, wherein:
each of the first optical patterns has a bar shape extending in a first direction when viewed in a plan view and has a trapezoidal shape when viewed in a sectional view taken along a second direction crossing the first direction; and
the first pattern shaping wires are connected to side surfaces of the first optical patterns.

4. The display device of claim 1, wherein the first optical patterns are spaced apart from each other by a uniform distance.

5. The display device of claim 1, wherein:
each of the first pattern shaping wires comprises an electroactive polymer; and
application of the control voltage to the first pattern shaping wires is configured to change a shape of at least some of the first optical patterns.

6. The display device of claim 1, wherein
when viewed in a plan view, a first distance between the first light source unit and each of the first optical patterns is greater than a second distance between the first light source unit and any of the second optical patterns.

7. The display device of claim 1, wherein:
the optical pattern unit further comprises third optical patterns; and
when viewed in a plan view, a third distance between the first light source unit and each of the third optical patterns is greater than the first distance and the second distance.

8. The display device of claim 7, further comprising:
a second light source unit configured to provide light to the light guide plate,
wherein the first light source unit and the second light source unit face each other with the light guide plate disposed therebetween.

9. The display device of claim 1, wherein:
each of the first optical patterns comprises:
a first surface facing the light guide plate;
a second surface facing the display panel; and
a side surface connecting the first surface to the second surface;
an area of the first surface is less than an area of the second surface; and
the first pattern shaping wires are connected to the side surfaces of the first optical patterns.

10. The display device of claim 1, wherein the display panel is configured to provide an image in a direction toward the light guide plate.

11. The display device of claim 1, wherein the display panel is configured to provide an image in a direction away from the light guide plate.

12. A display device, comprising:
a display panel;
a light guide plate on the display panel;
a first light source unit configured to provide light to a side surface of the light guide plate; and
an optical member between the light guide plate and the display panel,
wherein the optical member comprises:
an interconnection layer;
an optical pattern unit comprising a first optical pattern and a second optical pattern spaced apart from each other and disposed on a surface of the interconnection layer; and
pattern shaping wires configured to receive a control voltage from the interconnection layer and to control a shape of each of the first and second optical patterns via the control voltage,
wherein each of the first and second optical patterns has an isolated pattern shape and is connected to a respective some of the pattern shaping wires,
wherein the first optical pattern is spaced apart from the first light source unit by a first distance, and the second optical pattern is spaced apart from the first light source unit by a second distance greater than the first distance, and
wherein a first side surface of the first optical pattern has a first area, and a second side surface of the second optical pattern has a second area greater than the first area.

13. The display device of claim 12, wherein:
the pattern shaping wires connected to the first optical pattern having the first surface area are configured to receive a first control voltage;
the pattern shaping wires connected to the second optical pattern having the second surface area are configured to receive a second control voltage; and
the first control voltage is smaller than the second control voltage.

* * * * *